Oct. 26, 1943.    W. J. HOPP    2,332,574
DIAMOND GIRDLING MACHINE
Filed July 15, 1942    5 Sheets-Sheet 1
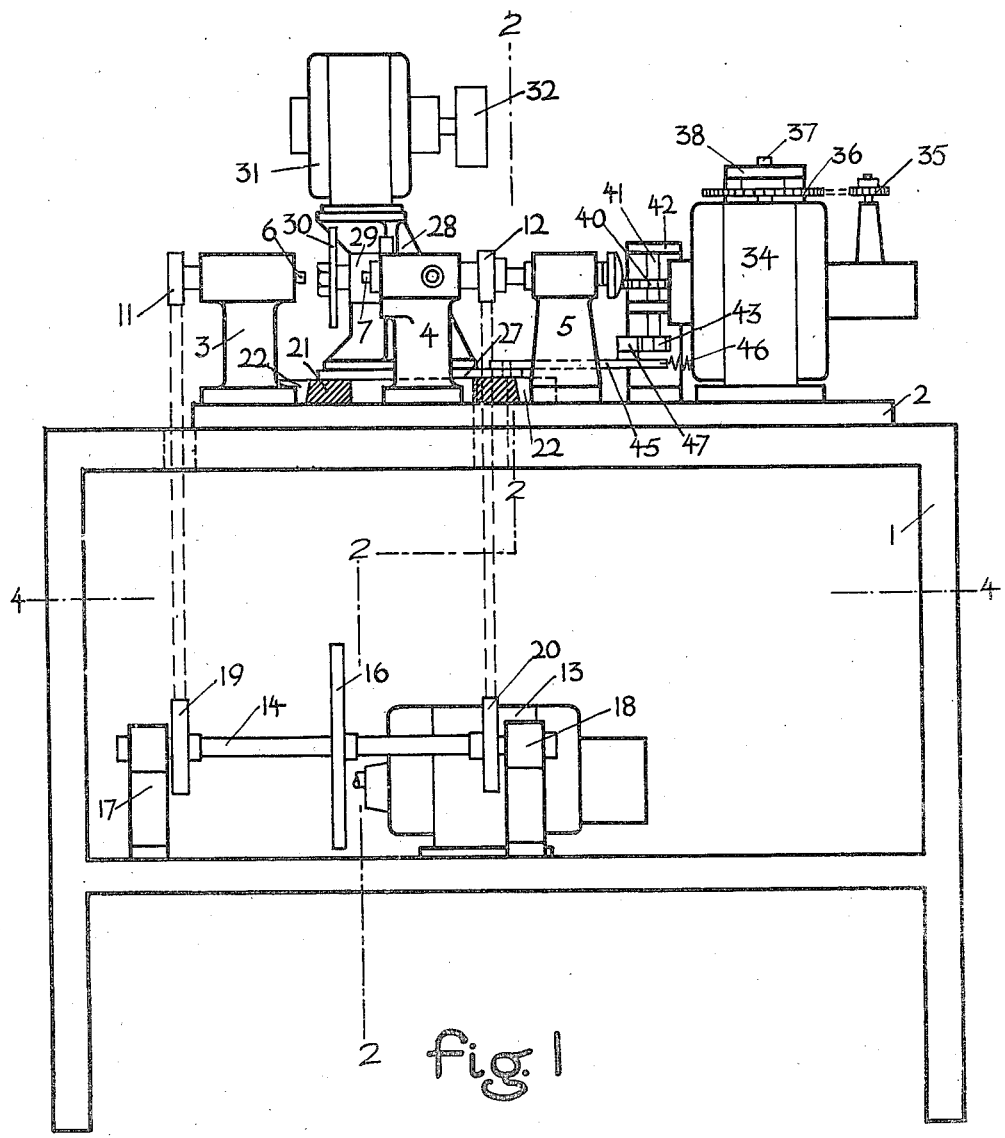
fig. 1
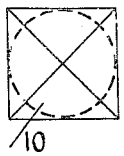 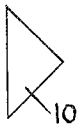
fig. 5
INVENTOR:
WILLIAM J. HOPP
BY Maurice Block
ATTORNEY.

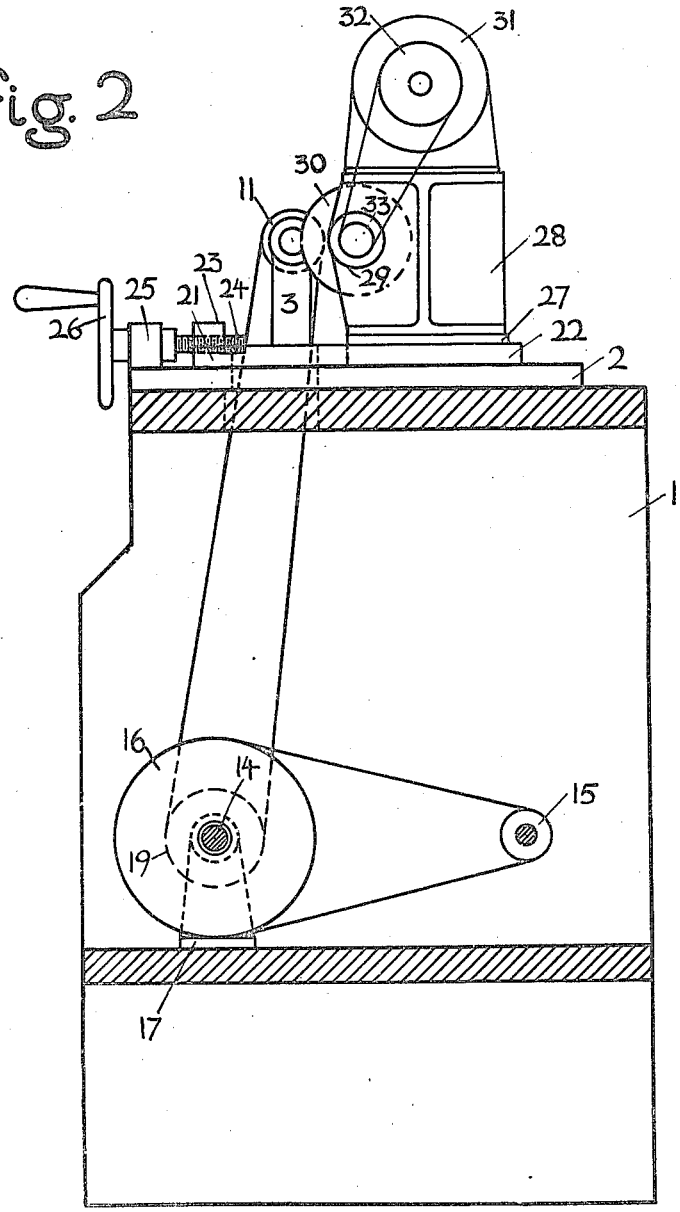

Oct. 26, 1943.                 W. J. HOPP                2,332,574
                         DIAMOND GIRDLING MACHINE
              Filed July 15, 1942           5 Sheets-Sheet 4
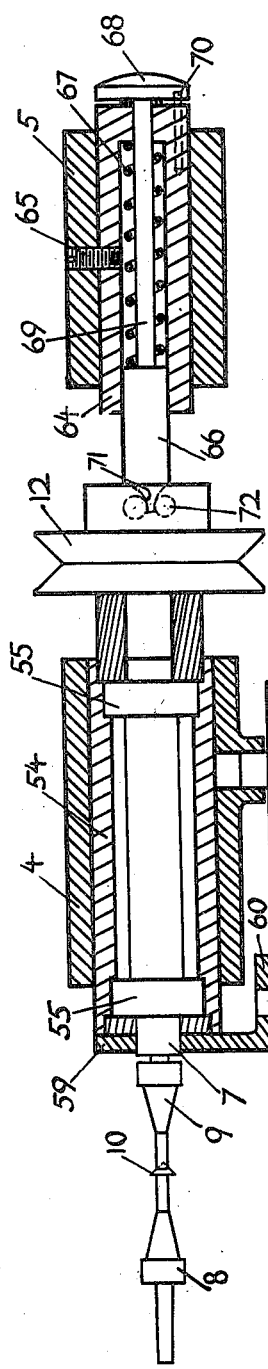
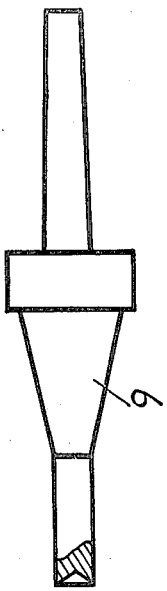
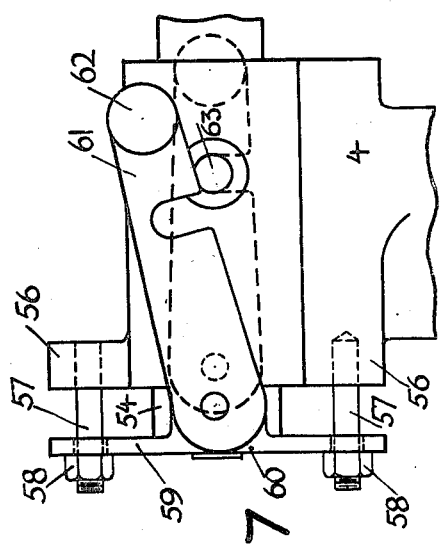
INVENTOR:
WILLIAM J. HOPP
BY
ATTORNEY.

Oct. 26, 1943.   W. J. HOPP   2,332,574
DIAMOND GIRDLING MACHINE
Filed July 15, 1942   5 Sheets-Sheet 5
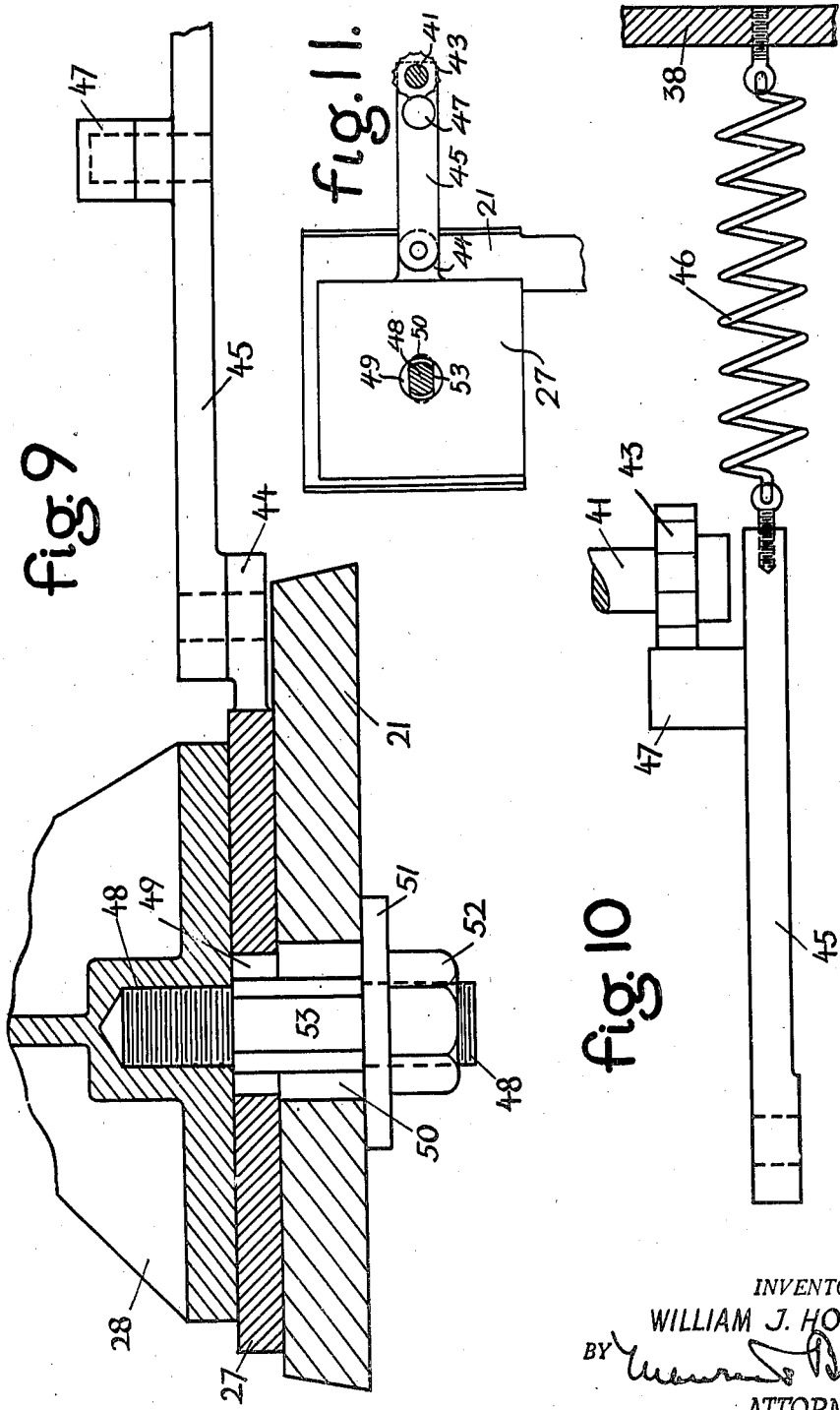
INVENTOR:
WILLIAM J. HOPP
BY
ATTORNEY.

Patented Oct. 26, 1943

2,332,574

UNITED STATES PATENT OFFICE 2,332,574

DIAMOND GIRDLING MACHINE

William J. Hopp, New York, N. Y., assignor to Harry Winston, Inc., New York, N. Y., a corporation of New York Application July 15, 1942, Serial No. 450,959

4 Claims. (Cl. 51—50)

My invention relates to diamond girdling, a step in the art of grinding diamonds by which step the lateral corners of the raw stone are rounded and the stone, thereby is prepared for faceting. Other precious stones having a hardness and other physical qualities similar to diamonds may be girdled in the same way. My invention relates also to such precious stones, and it is understood that speaking of diamonds, I include such similar stones.

The girdling of diamonds is a process which must be handled very delicately for several reasons, especially in order to avoid scratches or splitting whereby precious material would be lost. So far as I am aware, this operation has been heretofore accomplished by highly skilled workmen who have been holding a diamond pasted on to a holding tool against the diamond to be girdled; the diamond to be girdled was held by a special paste on to a revolving holder. Even an experienced workman failed often to accomplish the desirable accuracy of the shape or the largest possible size of the product.

An object of my invention is to provide a machine for the girdling of diamonds and a motor driven grinding wheel as a tool for cutting the corners of the diamond to be girdled. Further objects are to increase the economy of this operation, to reduce the time required for the same, to make the girdling process more accurate and less dependent on skilled labor, and to avoid any loss of material and other drawbacks mentioned above.

Further objects are to provide a machine having a shaft rotatable at uniform speed, to provide in this machine means for holding a diamond so that the central axis of the stone coincides with the axis of said shaft, to connect said holding means to the shaft exchangeably or adjustably, to provide means to exert an axial pressure on the stone whereby the diamond is held and centered, the conventional cementing or fusing of the stone is unnecessary and the diamond can be quickly inserted into and removed from the machine.

Still further objects are to provide a grinding wheel which is so situated and shaped that the peripheral surface of said wheel can be used to cut or to grind the corners of the stone whereby that part of the grinding wheel acts as a tool which moves at the highest speed and a high speed of the grinding surface is obtained with a relatively low number of revolutions per minute and with a centrifugal stress which will be well within the tensile strength of a diamond bond grinding wheel; to provide means to move the grinding wheel gradually and at any desired speed in a direction perpendicular to the axis of the stone carrying shaft whereby the progress of the girdling operation can be regulated as it is best suitable; and to provide motoric means for the rotation of both the stone carrying shaft and the grinding wheel, which means are independent from each other whereby the means driving the grinding wheel may take part in the horizontal movements of the grinding wheel and said movements do not interfere with the respective motoric means.

The extreme hardness of the stone and the relative weakness of the substance binding the grinding wheel makes it difficult to avoid scratches in the grinding wheel because the diamond is apt to cut into the wheel if the acting line of the grinding surface does not change perpetually. Therefore, another object is to avoid this drawback and to provide means to move the grinding wheel perpetually to and fro in a direction parallel to the axis of the stone carrying shaft. In contradistinction to machines for the grinding of long bodies where a grinding wheel is moved over a long way parallel to the grinded body in order to machine the entire length of the body, an object of the present invention is to provide for an oscillation of the grinding wheel which oscillation moves said wheel at a relatively high frequency over a very small distance, preferably not or substantially not exceeding the thickness of the grinding wheel.

Still other objects are to provide motoric means for the oscillation of the grinding wheel; to make said motoric means independent from the other motoric means used in the machine; to provide means to transmit the oscillating drive from a stationary motor to the grinding wheel whatever the position of said wheel to the stone might be; and to provide exchangeable or adjustable means by which the distance and the frequency of the oscillation can be so selected as it is desired in a particular case.

Still a further object is to produce a machine of the character described in which the maximum simplicity of construction and operation is secured.

Other objects and advantages will appear as the nature of the improvements is better understood, the invention consisting substantially in the novel shape, arrangement and co-operation of parts herein described and illustrated in the accompanying drawings, wherein similar reference characters are used to indicate corresponding parts throughout the several figures, and then finally pointed out and specifically defined in the appended claims.

The disclosure made the basis of exemplifying the present inventive concept suggest a practical embodiment thereof, but the invention is not to be restricted to the exact details of this disclosure, and the latter, therefore, is to be understood from an illustrative, rather than a restrictive standpoint.

The inventive idea involved is capable of receiving a variety of mechanical expressions, one of which, for the purpose of illustration, is shown in the accompanying drawings in which Figure 1 shows a front elevation of the entire machine on a reduced scale, some parts being omitted for the sake of clearer representation.

Figure 2 shows a cross-section taken along the line 2—2 in Figure 1 and seen from the right side, some parts being omitted.

Figure 5 shows the front and the side view of the approximate typical form of a diamond before and after the girdling, on an enlarged scale.

Figure 6 shows a partly sectional horizontal elevation of details belonging to the stone carrying shaft, in about natural scale.

Figure 7 shows a vertical side elevation of some parts shown in Fig. 6.

Figure 8 shows a partly sectional side elevation of one of the stone holding members, on an enlarged scale.

Figures 9 and 10 show partly sectional side elevations of details belonging to the oscillating device on about natural scale, Figure 10 being the continuation of Figure 9 to the right side.

Figure 11 shows a plan view of details shown in Figures 9 and 10, some parts of said details being broken off.

Figure 3:
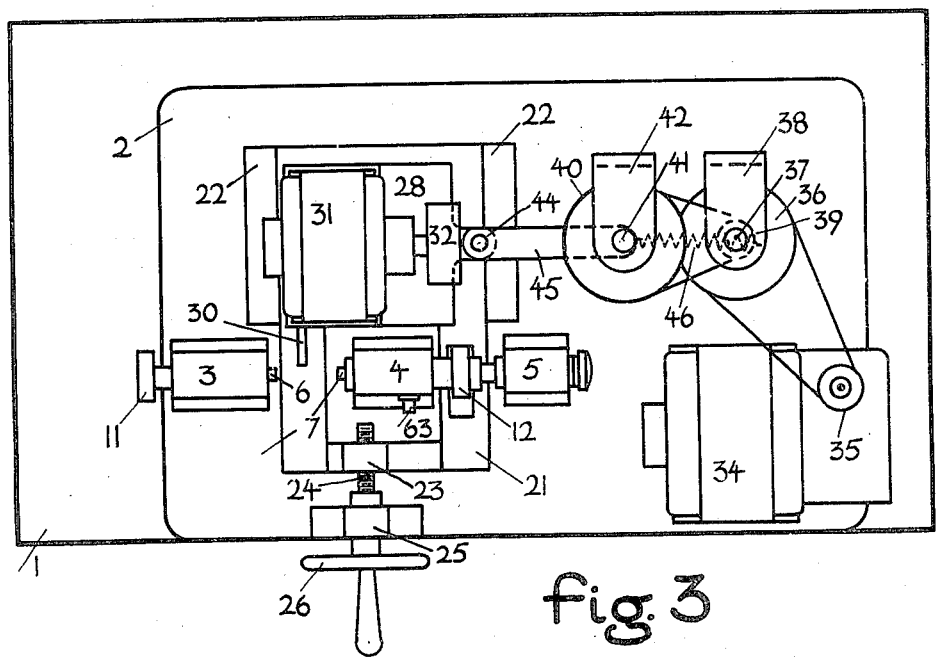
Figure 3 shows a plan view of the machine shown in Figures 1 and 2, seen from above whereby the upper level of the machine is visible.
Figure 4:
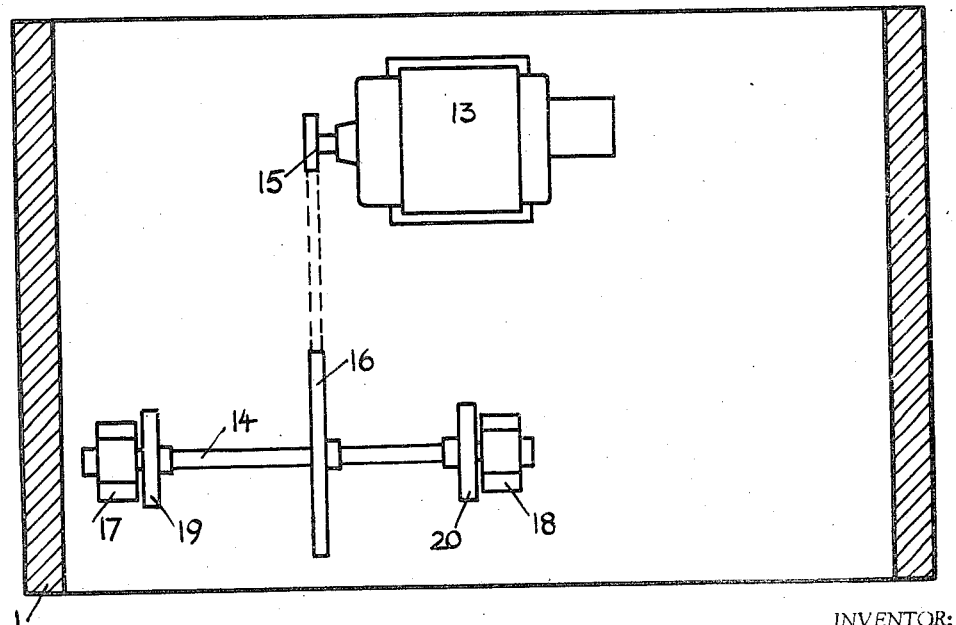
Figure 4 shows a horizontal cross-section taken along the line 4—4 in Figure 1 and seen from above whereby the lower level of the machine is visible.

Referring to the drawings, numeral 1 indicates a table having two horizontal levels. A mounting plate 2 having a finished upper surface is secured by screws to the upper side of the upper level of said table. Said connecting screws and other connections which will be referred to in the following and may be carried out by conventional means in known manner are not shown in the drawings.

The brackets 3, 4, and 5, each of which has a boring at its upper end, are so mounted on the plate 2 that the axes of their borings fall into one line. A shaft consisting of a left section 6 and a right section 7 is rotatably borne by said brackets as will be described later on. Between the sections 6 and 7 of the shaft, there is a distance sufficient for the insertion of the two stone holders 8 and 9 (Figs. 6 and 8) between which the stone 10 is held during the girdling operation. A pulley 11 is secured to the left shaft section 6, and a similar pulley 12 is secured to the right section 7.

A motor 13 which, in the shown embodiment, has a capacity of ⅛ H. P. and a speed of 860 revolutions per minute drives a countershaft 14 by means of a pulley 15 mounted on the motor shaft and a pulley 16 mounted on the countershaft 14. The countershaft 14 is supported by bearings provided in borings of the brackets 17 and 18 and carries pulleys 19 and 20 which, respectively, stand in line with the pulleys 11 and 12 and drive the latter by means of ropes or belts. In the shown embodiment, the diameters of the pulleys are so measured that the countershaft 14 makes about 200 revolutions and the shafts 6, 7 about 400 revolutions per minute. The motor 13 and the brackets 17, 18 are secured to the lower level of the table 1 either immediately or by means of an interposed mounting plate. Openings are provided in the upper level of the table for the passage of the ropes connecting the pulleys 11 and 12 to the pulleys 19 and 20 respectively.

The finished surface of the mounting plate 2 carries a sliding frame 21 which is movable along two sliding bars 22 permanently affixed to the plate 2. The frame 21 and the plate 2 are provided with openings for the passage of the rope or belt connecting the pulleys 12 and 20. The frame 21 is further provided with an eye 23 (Figures 2 and 3) having a threaded boring. A bolt 24 having a threaded end engaging the thread of the eye 23 is rotatably carried by a bearing 25 and secured to said bearing in axial direction. The bearing 25 is permanently affixed to the mounting plate 2. A hand wheel 26 is connected with the bolt 24 whereby turning of said hand wheel will move the sliding frame 21 in the direction of the bolt's axis.

A support plate 27 is slidably superposed to the frame 21 and carries a bracket 28 which is permanently connected with the plate 27. The entire machinery comprising the plate 27, the bracket 28 and the parts carried by said bracket is, by means which will be described later on, guided in the frame 21 in a direction perpendicular to the direction in which the frame 21 is moved by the hand wheel 26.

The bracket 28 is provided with a bearing 29 for a shaft carrying a diamond bond grinding wheel 30 which is so positioned that the sliding movement of the frame 21 varies the distance of the grinding circumference of said wheel from the stone held between the inner ends of the shaft sections 6 and 7. On its upper side, the bracket 28 carries a motor 31 having, in the described embodiment, ½₀ H. P. and driving the grinding wheel 30 by means of a pulley 32 mounted on the motor shaft, a pulley 33 mounted on the shaft of the wheel 30 and a belt connecting the pulleys 32 and 33 so that the grinding wheel makes about 4500 revolutions per minute.

A motor 34 having, in the described embodiment, ½₀ H. P. and provided with a ratiomotor having an output of 45 revolutions per minute is secured to the mounting plate 2 and drives a sprocket 35 (Fig. 3) which is connected by a chain to a sprocket 36 on a shaft 37. This shaft is supported by bearings in a bracket 38 mounted on the plate 2 and carries also another sprocket 39 (Figure 2) which is connected by a chain with a sprocket 40 on a shaft 41. The shaft 41 runs in bearings provided in a bracket 42 which is also mounted on the plate 2. The latter shaft, further, carries a wheel 43 having a circumference provided with curved recesses (Figure 11). The transmission by means of the sprockets 35, 36, 39 and 40 reduces the speed so that the wheel 43 makes about 4 revolutions per minute.

The support plate 27 has an extension 44 on its right side (Figures 9 and 11), said extension forming an eye linked with a joint to the left end of a bar 45 (Figures 10 and 11), the right end of which is drawn to the right side by a spring 46. One end of the spring 46 is affixed to the bar, the other end to a stationary part, for example, to the bracket 38. The bar 45 further carries a small roller 47 which is rotatable around a pin affixed to said bar. The roller 47 engages the circumference of the wheel 43 whereby the bar 45 and the support plate 27 are moved to and fro when the wheel 43 rotates, the spring 46 always securing close touch between the roller 47 and the wheel 43.

A stud 48 (Figures 9 and 11) is secured to the lower side of the bracket 28 and extends downward through a hole 49 in the support plate 27 and through a slotted hole 50 in the sliding frame 21. The lower end of the stud 48 is equipped with a washer 51 surrounding said end and with a nut 52 engaging a thread on the stud. The mounting plate 2 has an opening or recess providing space for the lower end of the stud 48, the nut 52 and the washer 51. Said washer is pressed by the nut 52 against a sholder on the stud 48 so that tightening of the nut will not clamp the frame 21 and the plate 27 together. The stud 48 has a middle portion of a diameter larger than the diameters of the threaded ends. This middle portion is flattened down to a thickness slightly smaller than the width of the slotted hole 50 whereby said middle portion obtains two parallel even surfaces 53 and slidably fits the side walls of the hole 50.

When the bar 45 and the plate 27 oscillate, due to the rotation of the wheel 43, the bracket 28 will also oscillate and is guided in this oscillating motion by the stud 48 sliding in the slotted hole 50. The grinding wheel 30 carried by the bracket 28 takes part in the oscillation and, thereby, moves to and fro in the direction of the slotted hole 50 which is parallel to the shafts 6, 7. The way or elongation of the oscillating movement is given by the depth of the recesses on the circumference of the wheel 43 and is relatively small, at any rate smaller or not substantially larger than the thickness of the grinding wheel 30. The frequency of the oscillations depends on the speed and on the number of recesses of the wheel 43 and is, in the shown embodiment, about 48 per minute.

The boring of the bracket 3 (Figures 1, 2 and 3) contains ball bearings (not shown) similar to ball bearings 55 in the bracket 4 (Figure 6). The shaft section 6 is inserted in said first ball bearings and has a slightly tapered boring in its right end for the insertion of a holder 8. A similar boring is provided in the corresponding left end of the shaft section 7 for the insertion of a similar holder 9 (Figure 8).

Usually, the diamon 10 to be girdled, has the form of a regular four sided pyramid (Figure 5), this form being typical for the natural shape of the raw stones. By the girdling operation, the four corners of the pyramid's base are cut off and rounded as indicated by the dotted line in the left view of Figure 5. The line perpendicular to the base surface and through the pyramid's point is regarded as the axis of the stone, and the latter is so inserted in the machine that the axis of the stone falls into the axis of the shafts 6, 7. As said before, the stone is held in this position by two holders 8 and 9 inserted into borings of the shaft sections 6 and 7. The stone holding ends of said holders are provided with cavities or recesses which may have any shape suitable for gripping the stone, for example, cup-shaped or conical as shown in Figure 8. Several different types of holders which fit different sizes or shapes of stones may be kept in store. From these, that pair of holders is selected which is most suitable in a particular case. After the insertion of the holders, they are caused to grip the stone by a slight axial movement which will be described later on.

The boring of the bracket 4 (Figures 6 and 7) contains a sleeve 54 slidable in said boring. Two ball bearings 55 inserted in the sleeve 54 support the shaft section 7 so that said section together with the bearings 55 and the sleeve 54 can slide in axial direction. The bracket 4 is provided with two eyes 56 in which bolts 57 are secured, the outer ends of which are provided with threads and nuts 58. A sliding plate 59 is positioned on the left side of the sleeve 54 and provided with a central hole for the passage of the shaft 7, with two lateral holes for the passage of the bolts 57 and with a rectangularly bent extension 60 forming an eye for a joint where an arm 61 is linked. The arm 61 extends about parallel to the shaft axis and has a handle 62 and an incision or recess fitting the pin 63 which is secured to the side of the bracket 4. In the utmost right position (shown in dotted lines in Figure 7), said recess is slipped over the pin 63 whereby the arm 61 is temporarily secured and holds the sliding plate 59 in its right end position. When the arm 61 is lifted by the handle 62, the pin 63 releases the arm, and the plate 59 is free to return to its utmost left position, excessive motion being barred by the nuts 58.

The boring of the bracket 5 (Figure 6) contains a sleeve 64 secured to said bracket by a screw 65 and having a central boring in which a cylindrical body or piston 66 is slidably inserted. The piston 66 is pressed to the left side by a coiled spring 67 placed in the boring of the sleeve 64 and can be drawn to the right side against the pressure of the spring 67 by a hand boss 68 which is connected to the piston 66 by a central rod 69 and guided in its axial motion by a thin pin 70 secured to the boss 68 and sliding in a small hole of the sleeve 64.

On its outer side, the piston 66 terminates in a curved, reduced end 71 fitting the inner side of balls 72 forming a ball bearing, the rotating ring of which forms a part of or is secured to the shaft section 7. Under the pressure of the spring 67, the piston 66 presses the shaft section 7 to the left side to a position where further axial motion is stopped, either by the plate 59 placed before the sleeve 54 or by the stone 10 held by the shaft section 6.

When the machine is prepared for operation, such sizes of pulleys and sprockets may be selected from a store as will accomplish that ratio of the respective drives which is regarded as best fit for a particular case. Also grinding wheels of different diameters, thicknesses, compositions or other properties may be kept in store for proper selection. It is of particular importance that several wheels of the kind of wheel 43 are available, said wheels differing in number or depth of the recesses. Also these wheels may have different diameters. A set of rollers 47 may be kept in store, said rollers having different diameters to fit the different shapes of recesses in the circumference of the different wheels 43. Furthermore, several bars 45 having different distances between the left joint end and the axis of the roller 47 are kept in store so that a particular bar 45 can be always selected which provides for the correct position of the parts involved.

The mounting and dismounting of the stone carrying shaft is facilitated by the hand boss 68 which may be pulled to the right side in order to release the right end of the shaft section temporarily.

The screw connection securing the bracket 28 to the support plate 27 may provide for a slight adjustment of said parts in horizontal direction whenever such adjustment is desired, for example, to bring the grinding wheel into the correct position with respect to the stone.

When the exchangeable parts have been selected and inserted and the machine has been adjusted as said above, it is ready for girdling a series of diamonds having about the same size. When a diamond is to be inserted, the workman pulls the handle 62, thereby opening the gap between the inner ends of the holders 8 and 9, holds the diamond between said ends and releases the handle again, whereupon the stone is fixed in the operating position. Renewed operation of the handle 62 will release the stone again, and then, the machine is immediately ready for the reception of the next stone.

After the diamond is inserted and the three motors are switched on, the workman turns the hand wheel 26, thereby gradually moving the grinding wheel 30 toward the stone until the cylindrical circumference of the grinding wheel contacts the diamond. Then he continues in this operation until the desired part of the stone is ground off. The gradual turning of the hand wheel 26 is the only operation which the workman has to perform during the grinding process. Therefore, he can concentrate his mind on this operation and accomplish a highly qualified result with little skill.

Every motor used in the machine, also the motor 31 carried by the movable bracket 28, is stationary with respect to the shafts driven by the motor whereby the drive is reliable and uniform during the entire grinding process and an accurate and uniform operation is secured.

The oscillation of the grinding wheel brings a broad band of its circumference in alternative contact with the diamond whereby a uniform consumption and long duration of the grinding surface and an accurate and economic grinding process is obtained.

Having, thus described an illustrative embodiment of my invention and how it operates, I claim:

1. A diamond girdling machine having a shaft; means supporting said shaft; means for turning said shaft; means for holding a diamond, said latter means connected to said shaft; a second shaft; motoric means for turning said second shaft; a grinding wheel affixed to said second shaft; a bracket supporting said second shaft and carrying said motoric means for turning said second shaft; and means to oscillate said bracket, said oscillating means comprising a wheel having recesses on its circumference; motoric means to turn said wheel; a bar connected to said bracket and extending in radial direction to said wheel; means connected to said bar and touching the circumference of said wheel; and means to draw said bar as far in the direction to said wheel as the present position of said recesses allows.

2. A diamond girdling machine having a shaft; means supporting said shaft; means for turning said shaft; means for holding a diamond, said latter means connected to said shaft; a second shaft; motoric means for turning said second shaft; a grinding wheel affixed to said second shaft; a bracket supporting said second shaft and carrying said motoric means for turning said second shaft; and means to oscillate said bracket, said oscillating means comprising a wheel having recesses on its circumference; motoric means for turning said wheel; a bar connected to said bracket; means connected to said bar and contacting the circumference of said wheel; and a spring having one end stationarily secured and the other end affixed to said bar whereby said spring tends to move said bar in the direction toward said wheel.

3. A diamond girdling machine having a shaft; means supporting said shaft; means for turning said shaft; means for holding a diamond, said latter means connected to said shaft; a second shaft; motoric means for turning said second shaft; a grinding wheel affixed to said second shaft; a bracket supporting said second shaft and carrying said motoric means for turning said second shaft; and means to oscillate said bracket; a sliding frame carrying said bracket; means to guide and to move said frame in a direction perpendicular to said first shaft; a member connected to said bracket; and means to guide said member relative to said frame in a direction parallel to said first shaft.

4. A diamond girdling machine having a shaft; means supporting said shaft; means for turning said shaft; means for holding a diamond, said latter means connected to said shaft; a second shaft; motoric means for turning said second shaft; a grinding wheel affixed to said second shaft; a bracket supporting said second shaft and carrying said motoric means for turning said second shaft; and means to oscillate said bracket, said oscillating means comprising a bar; a joint connecting said bar with said bracket; means to oscillate said bar in longitudinal direction; said machine further comprising a sliding frame carrying said bracket; means to guide and to move said frame in a direction perpendicular to said first shaft; a member connected to said bracket; and means to guide said member relative to said frame in a direction parallel to said first shaft.

WILLIAM J. HOPP.